US009615136B1

(12) United States Patent
Emery et al.

(10) Patent No.: US 9,615,136 B1
(45) Date of Patent: Apr. 4, 2017

(54) VIDEO CLASSIFICATION

(71) Applicant: Amazon Technologies, Inc., Reno, NV (US)

(72) Inventors: Grant Michael Emery, Seattle, WA (US); Rahul Hemant Bhagat, Issaquah, WA (US); Brian Cameros, Seattle, WA (US); Benjamin Thomas Cohen, Seattle, WA (US); Logan Luyet Dillard, Seattle, WA (US); Yongwen Liang, Seattle, WA (US); Scott Allen Mongrain, Seattle, WA (US); Michael David Quinn, Seattle, WA (US); Eli Glen Rosofsky, Seattle, WA (US); Adam Callahan Sanders, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/887,107

(22) Filed: May 3, 2013

(51) Int. Cl.
H04N 7/173 (2011.01)
H04N 21/472 (2011.01)
H04N 21/258 (2011.01)
H04N 21/442 (2011.01)
H04N 5/445 (2011.01)

(52) U.S. Cl.
CPC . H04N 21/47202 (2013.01); H04N 21/25891 (2013.01); H04N 21/44222 (2013.01)

(58) Field of Classification Search
CPC ........... H04N 21/25435; H04N 21/266; H04N 21/251; H04N 21/25891; H04N 21/44222

USPC .............................................. 725/46, 45, 28
See application file for complete search history.

(56) References Cited

U.S. PATENT DOCUMENTS

| 5,758,257 | A | * | 5/1998 | Herz et al. | 725/116 |
|---|---|---|---|---|---|
| 7,343,616 | B1 | * | 3/2008 | Takahashi et al. | 725/46 |
| 7,640,563 | B2 | * | 12/2009 | Marsh | 725/45 |
| 8,214,361 | B1 | | 7/2012 | Sandler et al. | |
| 9,087,297 | B1 | | 7/2015 | Filippova et al. | |
| 2002/0059094 | A1 | * | 5/2002 | Hosea et al. | 705/10 |
| 2003/0097353 | A1 | * | 5/2003 | Gutta et al. | 707/1 |
| 2006/0129446 | A1 | | 6/2006 | Ruhl et al. | |
| 2007/0011039 | A1 | * | 1/2007 | Oddo | 705/10 |
| 2007/0294740 | A1 | * | 12/2007 | Drake et al. | 725/131 |
| 2008/0010266 | A1 | * | 1/2008 | Brunn | G06F 17/30867 |
| 2009/0150920 | A1 | | 6/2009 | Jones | |
| 2009/0171943 | A1 | * | 7/2009 | Majumder | G06F 17/30864 |
| 2009/0234828 | A1 | * | 9/2009 | Tu | G06F 17/30828 |
| 2010/0262615 | A1 | * | 10/2010 | Oztekin | G06F 17/30707 707/768 |
| 2011/0004508 | A1 | | 1/2011 | Huang et al. | |
| 2011/0218946 | A1 | * | 9/2011 | Stern | H04L 12/1859 706/12 |
| 2013/0124447 | A1 | * | 5/2013 | Badros | G06Q 30/0251 706/52 |

(Continued)

*Primary Examiner* — Pankaj Kumar
*Assistant Examiner* — Reuben M Brown
(74) *Attorney, Agent, or Firm* — Thorpe North & Western LLP

(57) ABSTRACT

The present technology may identify item category affinities by identifying a plurality of classifications of an item. An accuracy of the plurality of classifications relative to one another for the item may be identified. A category affinity of the item may be determined based on the accuracy of the plurality of classifications relative to one another.

21 Claims, 11 Drawing Sheets

(56) References Cited

U.S. PATENT DOCUMENTS

2014/0337298 A1\* 11/2014 Kandekar ......... G06F 17/30244
 707/688

\* cited by examiner

VIDEO CLASSIFICATION

BACKGROUND

Search interfaces may serve as gateways to information and content located in data stores. Computer data stores are commonly used in storing various types and formats of information, such as text documents, images, videos, audio files, as well as many other types of content. However, many data stores include a large amount of data. As a result, browsing or searching through a catalog of content, without some form of structured search or navigational refinements may result in a user sifting through a large and unmanageable number of search results. Finding a desired result among a significant number of search results may be tedious and inefficient.

Some search interfaces offer search guidance or refinements to improve searching through large troves of data. Various user interfaces exist for displaying or browsing through a catalog, which may include thumbnail images, text, hyperlinks and so forth. For example, images may be useful when browsing through a catalog of videos or other content items. Nevertheless, difficulties in finding a desired video may increase as a number of available videos increases. Users may desire an improved user friendly user interface that enables browsing and searching for content of interest.

DETAILED DESCRIPTION

The present technology may assist users in navigating among and selecting a digital work or content item, such as a video, audio file, image, text document and so forth for consumption. In one example, videos may be classified by identifying a video using a user review regarding the video. An evaluation attribute associated with the review may be identified and then be associated with the video. The evaluation attribute may include, for example, a textual term from the review describing the video or describing the user's analysis or feelings about the video. The video may be classified into a classification using a classification scheme based on the evaluation attributes collected. For example, the classification scheme may classify the video with other videos sharing a similar or identical evaluation attribute. A user interface representation of the video may be provided for display with user interface representations of other videos sharing the classification. In this way, videos may be classified and arranged for presentation based on user input. The videos may also be classified and arranged using existing classifications or categorizations (e.g., comedy, drama, romance, sci-fi and so forth) that are combined with the classifications created with user input.

In a further example, the present technology may enable identification of category affinities for videos. Where, multiple classifications are assigned to or identified for an individual video, a ranking of the classifications relative to one another for the individual digital work may be identified. A user interface representation of the video, such as a thumbnail image, may be provided for display on a client device with user interface representations of other videos having a same classification when a request for one of the classifications is received from a client device. For example, a video may be identified as belonging to both comedy and romance classifications. If the video is classified as, for example, approximately 80% comedy and 20% romance, then the video may be more prominently displayed among other comedy videos and less prominently displayed among other romance videos due to the high comedy affinity and the low romance affinity.

Figure 1:
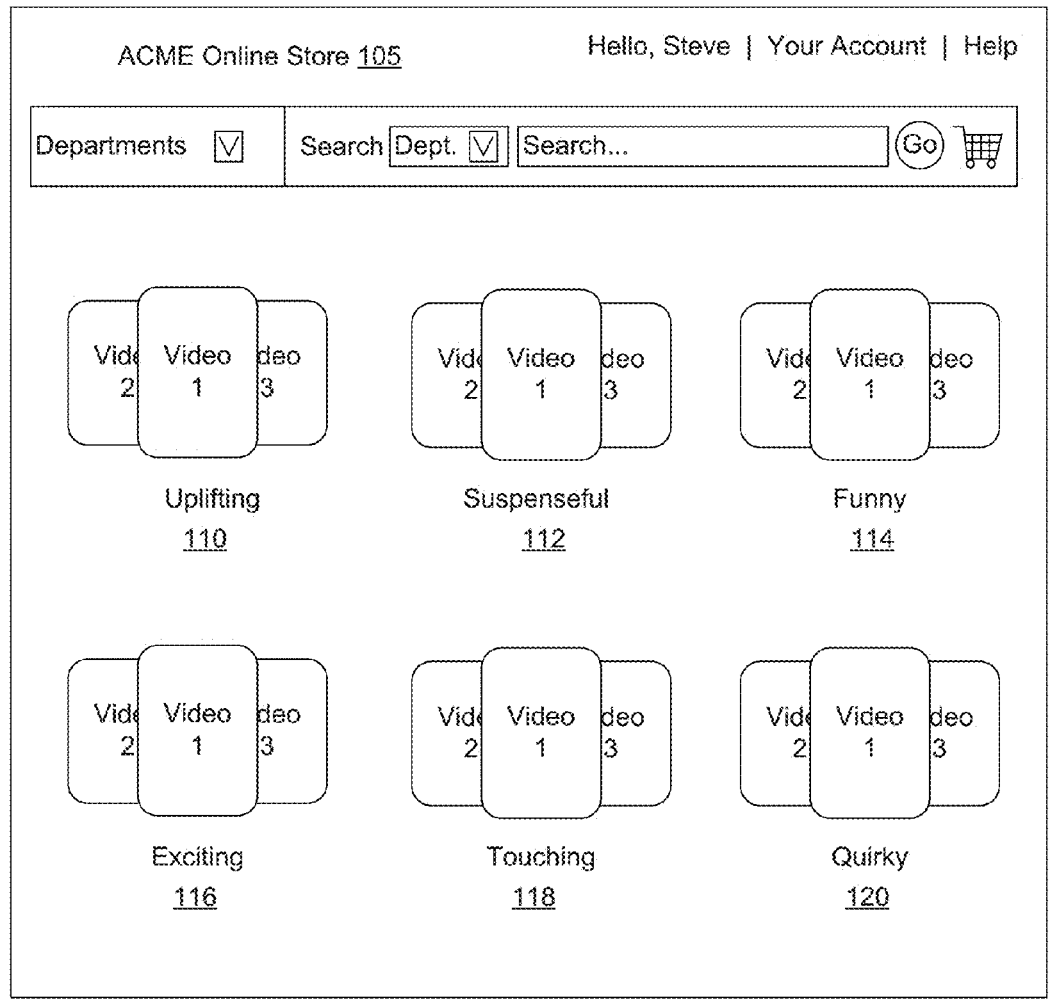
FIG. 1 is an illustration of a network page including video classifications for browsing videos in accordance with an example of the present technology.

Referring to FIG. 1, a network page 105 or a graphical user interface for an electronic retailer or video distributor is illustrated in accordance with an example of the present technology. The page 105 may be a front-end interface with which users may interact and which may display videos organized by mood, theme, genre, type, setting and so forth. Users may select a video or video category 110, 112, 114, 116, 118, 120 from the illustrated page and may be taken to a page 205 as in FIG. 2, displaying a combination (e.g., 'mash-up') of other moods/themes/genres/etc. 214, 216, 218 that may cut across the initial selection 212 (see also 112 in FIG. 1), allowing users to quickly hone in on a type of video the user is seeking. For example, if the user selected "suspenseful" 112 in FIG. 1, the videos displayed on the linked page in FIG. 2 may include different types or classifications of suspenseful videos, such as 'suspenseful and mystery thrillers' 214, 'dark and suspenseful' 216, 'suspenseful dramas' 218 and so forth.

In one example, categorization or classification of the videos may be based, at least in part, on user generated content, user feedback or comments on the videos. More specifically, the categorization may be based on user reviews of the videos. For example, rather than just 'adventure' videos, a system may identify that users may have identified certain adventure videos as 'feel-good' adventures and may thus classify such videos as 'feel-good adventure'. As another example, users may have identified a video as 'gritty' and/or 'dystopian' and the video may be classified with other similarly identified videos as a 'gritty dystopian' video. Comments may include reviews, as well as other forms of user feedback, such as checkboxes, radio buttons, freeform text boxes or any other suitable mechanism for enabling user feedback from which classifications may be based. User generated content may include comments or reviews, but may also more broadly include a wide variety of other content types, such as a blog entry, free form text, guided form text, an image, a video, an audio clip and so forth. The organization or order of videos, genres, classifications and so forth for display may be personalized for recognized users and/or based on popularity for unrecognized users.

The present technology may generate moods, themes and genres and so forth (which may comprise the classifications referred to previously). Existing or known moods and the like may be used along with other moods identified from user reviews or other sources. The other sources may optionally be group-sourced data, such as reviews, Wikipedia® entries, forum posts, social media data (such as from a social network) and so forth. For example, 'good dialogue' may be a classification based on group-sourced data. In one implementation, videos may be classified or assigned to moods by running a machine-learning classifier over user reviews of the videos. Themes may be created by running a machine-learning label propagation process over plot keywords. Genres may be imported from existing data or extracted from other group-sourced data, such as Wikipedia video classifications.

Figure 2:
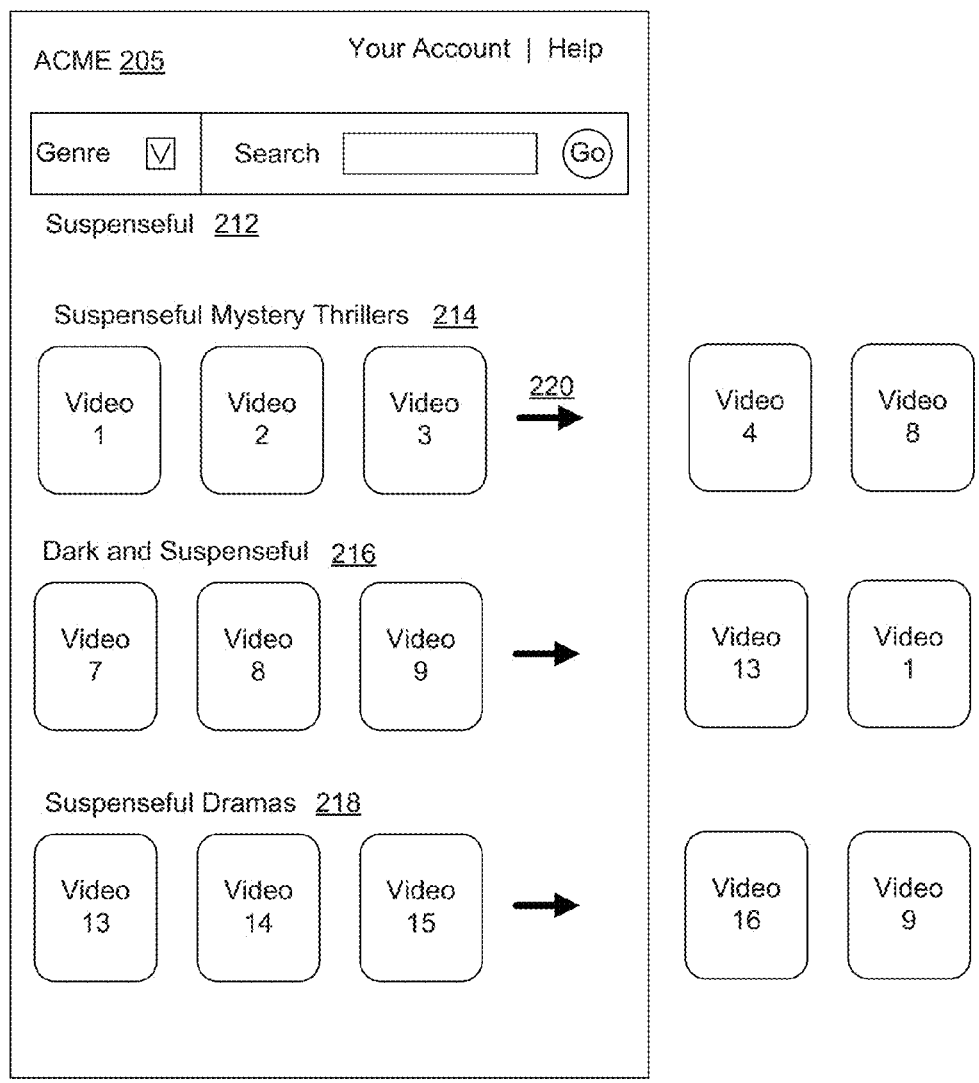
FIG. 2 is an illustration of a network page including sub-categorizations of a video classification in accordance with an example of the present technology.

With reference to FIG. 2, videos may be organized such that a user is presented, at least initially, with an array of videos that includes few or no repeated (i.e., no duplicate videos). Because each of the classifications listed (i.e., 'suspenseful and mystery thrillers' 214, 'dark and suspenseful' 216, 'suspenseful dramas' 218) relate to 'suspenseful' 212, a single video may be classified across multiple of the classifications. However, providing multiple classifications may become less useful to a user if a similar list of videos is shown for each classification. The present technology may identify when a video is assigned to or associated with multiple classifications and arrange the videos such that the video with the multiple classifications is displayed for a single classification. This enables additional, different videos to be displayed to the user to provide a broad selection from which the user may select a video.

In an alternative example as shown in FIG. 2, videos 8, 13, 1 and 9 are shared across at least two of the classifications, but are arranged such that the initially displayed videos are non-duplicate in an area viewable by the end user. In other words, for a side-scrolling list implementation as illustrated, duplicate videos may be arranged such that scrolling to the side may display the duplicate videos, but the duplicate videos may otherwise be initially hidden from view. When the user clicks an arrow 220 or otherwise selects to view more videos not currently displayed for a desired classification, the initially hidden videos (i.e., videos 4, 8, 13, 1 16 and 9) may be displayed, such as by scrolling the videos into view from a side, for example.

Organization of the videos, including a determination of how videos are to be arranged for display, may be based at least in part on category affinity determinations or designations. For example, video 1 may be classified as a 'suspenseful and mystery thriller' as well as 'dark and suspenseful'. Although the video may be both dark and mysterious, 'mystery' may be comparatively more representative of the video than 'dark', resulting in video 1 being prominently arranged within the 'suspenseful and mystery thrillers' and less prominently arranged within the 'dark and suspenseful' videos. Further, the category affinity may result in video 1 being displayed initially in one classification (i.e., 'suspenseful and mystery thrillers') and being hidden from initial view within another classification (i.e., 'dark and suspenseful').

Reference has been made to 'displaying' a video. Displaying a video may refer to displaying a representation or user interface representation of the video, such as a thumbnail image, descriptive text, a hyperlink and so forth which may be representative of the video. Unless otherwise indicated or applicable for a particular context, 'displaying a video' may refer to the display of a representation of the video rather than actual commencement of playback, streaming, etc. of the video.

The term 'video', as used herein, may refer to movies, television programs and any other type of video. 'Video' may refer to digital video, such as download videos or so-called 'on-demand' videos, or may refer to physical video media, such as a digital video disc (DVD) or the like. For example, the user interfaces of FIGS. 1 and 2 may be for enabling instant viewing of videos over a network connection or may be for identifying and selecting a physical video media for purchase and/or shipment.

While the present technology may be described primarily in the context of video, the technology may also be applied in a variety of other digital work or content item (digital or non-digital) contexts. A 'digital work' may refer to a video, image, audio file, text (such as e-books, documents, and the like), electronic games, software, etc. or any combination thereof. A 'content item' may include items similar to digital works, but may further encompass digital and/or physical embodiments of the items. The present technology may also be used more expansively in the context of any other type of items. For example, clothing, sporting goods, appliances and virtually any other item or type of item may be classified based on user reviews, comments, user generated content or the like. Various examples of the systems, methods and other aspects of the technology are thus described in the context of consumable content generally, and video specifically, without specific limitation to such video implementations, or to consumable content implementations.

Figure 3:
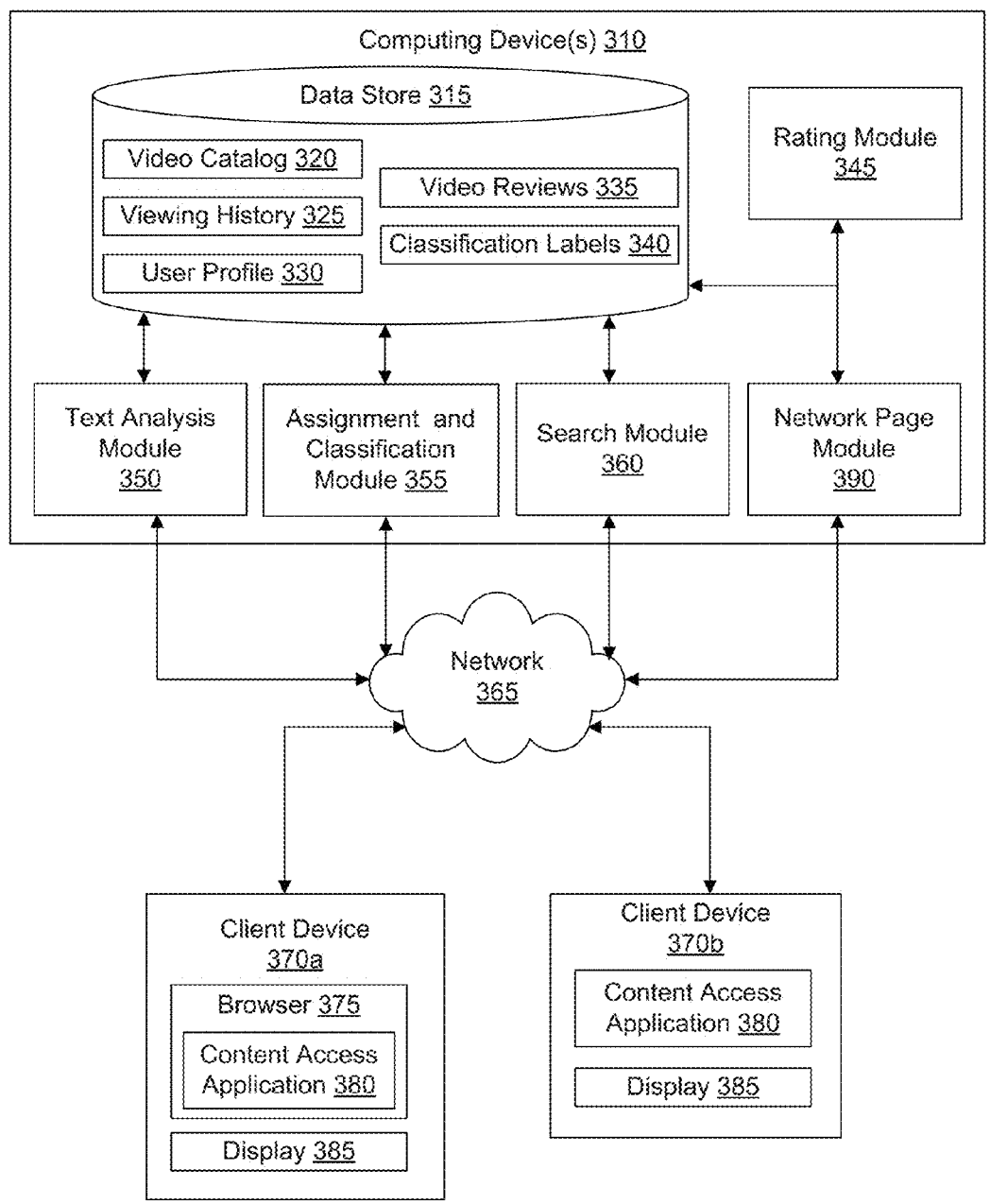
FIG. 3 is a block diagram of a review sourced user interface system in accordance with an example of the present technology.

Referring now to FIG. 3, a block diagram of a review sourced user interface system is illustrated in accordance with an example of the present technology. The system may be implemented on one or more computing devices 310 and/or client devices 370a-370b, and may be implemented using a network 365. The system may include a data store 315 and a number of modules 350, 355, 360, 390 for storing and processing video classification data.

The system may include the network page module 390 for displaying network pages, including search fields, user interfaces, product or video data and any other suitable object or data for facilitating or enhancing user interaction with the electronic retailer. The network page module 390 may access data in the video catalog data store 320 for providing search results, video information and other network page data for display on the client device 370a, 370b. The video catalog data store 320 may include, for example, the videos or content items available for purchase or for instant consumption (e.g., viewing or listening) from an electronic retailer. The video catalog data store 320 may include text, images, video and so forth, and may be structured for suitable display on a client device's 370a, 370b display 385 via a browser 375 or content access application 380, such as in the form of a webpage or website. The video catalog data store 320 may also include video product identifications, such as alphanumeric values or the like, for unique product identification, association with product reviews, designation in purchase histories and so forth. The user profile data 330 may include, for example, demographic information of the user (such as location, age, gender, etc.), user preferences and so forth. In one aspect, the user profile data 330 may be used to improve search results. The viewing history data store 325 may include, for example, a browsing history of the user, purchase history of the user, viewing history and so forth. The data store 315 may further include a video review data store 335 for storing user reviews or comments and a classification label data store 340 for storing and organizing labels assigned to videos based on the video reviews.

The system in FIG. 3 may include a text analysis module 350 configured to use a processor to analyze a review related to a content item to identify an evaluation attribute from within the review. The text analysis module 350 may be configured to analyze reviews related to a content item or video to identify phrases from within the reviews. In other words, the text analysis module 350 may parse the text of user comments, product reviews, feedback, etc. to identify words and/or discrete phrases within a comment, product review or the other user generated content associated with the content item.

The text analysis module 350 may further analyze the identified phrases by finding nouns, verbs, adjectives, root words, sentiment, sentence or language structure, and so forth. The text analysis module 350 may expand or reduce the number of words in an individual phrase according to words adjacent to a phrase to ensure that a full and accurate representation of the text is identified. For example, if a review indicates that a video is "not funny", inclusion of the negative "not" in the phrase may make a significant difference in whether the evaluation attribute is accurate and/or useful to a user, or to an advertiser.

The text analysis module 350 may be further configured to compare phrases identified in one review with phrases identified in another review to determine a degree of similarity. For example, similarity of root words, sentiment, verbs, adjectives, nouns, etc. may be compared for phrases from different video reviews. Similarity may also be identified when different words with similar meanings are used. Thus, the text analysis module 350 may include or have access to a thesaurus to identify when words used in the reviews are synonyms of one another.

An assignment and classification module 355 may cluster similar phrases together based upon the determined degree of similarity. If two phrases are sufficiently similar, the phrases may be clustered together. Thus, for example, "funny romance" and "romantic comedy" may be clustered together. Various methods of text analysis may be used to determine the degree of similarity between phrases. Two phrases may be deemed sufficiently similar if, for example, the phrases share a minimum number of the same or similar words, share root words, the phrases share a similar noun, the phrases share a similar sentiment, and so forth. Clustering of phrases may be fine-tuned based on customer feedback or other factors to modify the degree of similarity of phrases sufficient to cluster phrases together. While clustering, recognition of synonyms and other features described may be useful in grouping like phrases together, the technology may be used by simply identifying the same phrases from multiple reviews. In one aspect, new classifications may be generated when an identified evaluation attribute fails to fit within an existing classification for clustering with other evaluation attributes.

Analysis, clustering and other processing of evaluation attributes may be performed on a per classification basis. For example, reviews related to videos within a video category or classification may be analyzed, clustered and otherwise processed together, collectively. Rather than analyzing reviews related solely to a 'suspenseful mystery thrillers', the analysis may consider reviews for the various 'suspenseful' classifications together, or may be performed independently of any specific classification, such as across all classifications. As an alternate example, reviews related to an individual video may provide a sufficient basis for identifying evaluation attributes relevant to the individual video, and phrases identified from within the reviews may be clustered for the individual video. As another example, the above-described analysis may be performed on an individual video basis and then again on a video classification basis or any other suitable basis to create clusters from multiple videos before classifying videos according to identified evaluation attributes.

Because video distributors conventionally provide video classifications that are rigidly defined and are independent of user interpretations or thoughts on the video, the present technology for analyzing and classifying videos may result in more user-friendly navigation, more accurate search results, and/or more effectively placed advertisements.

The assignment and classification module 355 may assign labels to videos based on identified evaluation attributes. The assignment of labels may be further based on the presence of other videos or reviews with similar evaluation attributes, and these related videos may be clustered together. The assignment and classification module 355 may generate a label based on a phrase identified from within the reviews. In one aspect, the label may be text, exactly as found within the review. In another aspect, the label may be similar to text found within the review. When a phrase from a product review is clustered with other phrases, the assignment and classification module 355 may identify one or more phrases which are representative of the phrases within the cluster to serve as one or more labels. In one example, a single phrase may be selected from a cluster to be representative of the cluster. However, where multiple phrases within a cluster are well-represented (i.e., multiple phrases are found to be highly used), use of multiple labels may be desirable to more closely fit what users may be searching for when navigating among videos or entering search queries.

Once a label is generated from the review, the label may be associated with the video using the assignment and classification module 355. For example, retailers commonly use product identifications to identify a product. The identification number may be a model number, serial number, Universal Product Code (UPC), International Standard Book Number (ISBN), product name, Uniform Resource Locator (URL), or other useful identifier of the product, which may be unique among other products sold by the retailer. In one configuration, the identification number may identify a video or other content item available for purchase, instant viewing, etc. The assignment and classification module 355 may thus create a label which is associated with the video according to the identification of the video.

The assignment and classification module 355 may determine a frequency of occurrence of the labels (e.g., the phrases or similar phrases) occurring in the reviews. Labels with a higher frequency of occurrence may be ranked higher than labels with a lower frequency of occurrence. The more commonly occurring phrases may be phrases which are more representative of the video or which may be more helpful to a user.

A search module 360 may identify at least one label associated with videos or content items for display in a classification to the user. The search module 360 may search and identify the label based on user preferences, viewing history, current browsing session context, user input or any other suitable basis of search. As a result, the search module 360 may easily perform a lookup for labels associated with any particular video.

The phrases or labels generated and assigned from the reviews may be or include n-grams, and may preferably include vocabular n-grams. An n-gram may generally be any combination of letters, numbers, symbols and the like. For purposes of the present technology, an n-gram generally refers to phonemes, syllables, letters or words. As described, the n-grams may be collected from a textual comment, such as the text of a review for a content item or product. n-grams exist in various sizes, where a size 1 n-gram is a "unigram"; a size 2 is a "bigram" or "digram"; a size 3 is a "trigram"; a size 4 is a "tetragram"; a size 5 is a "pentagram" and so forth. The sizes may also be referred to by the value of n, such as "four-gram", "five-gram", and so forth. The sizes refer to a number of phonemes, syllables, letters, or words. Where the n-gram is a vocabular n-gram the size refers to a number of words.

Any size of n-gram may be used with the present technology, such as from a unigram to an arbitrarily large n-gram. However, user-submitted comments, reviews, and the like may have a finite length, which length is commonly broken into discrete sentences and/or paragraphs. For effective application of the present technology, the n-grams identified from the reviews (e.g., a review sourced video classification) may often consist of a token or phrase that is less than the entire review. Otherwise, use of an n-gram as a label or classification may not be helpful to a user or helpful in classifying videos. Thus, in one example, the size of n-gram for use as a review sourced video classification may range approximately from 1-10. In a more specific example, an upper limit on the size of an n-gram may be 4, 5, 6, or 7. In a specific example, a lower limit on the size of the n-gram may be 2. The usability and effectiveness of a review sourced video classification may be diminished when based on a unigram because the context of the unigram may be lost.

In one example, the assignment and classification module 355 may determine a similarity of labels associated with videos and to cluster subsets of the videos into classifications based on the similarity of the labels. The assignment and classification module 355 may summarize labels from multiple videos to identify labels with high rankings across multiple videos. For example, the assignment and classification module 355 may look at the most frequently occurring labels for each of the videos and identify which labels are shared among the products. The labels may be considered shared when labels for different videos are the same or are at least similar within a predetermined threshold or degree. Similarity may be determined according to the similarity determination used in clustering phrases when generating labels. Once shared labels have been identified, the ranking of the shared labels may be weighted according to the rankings within individual labels. A simple approach may be to use the frequency of occurrence of a label across a set or group of videos, or even across all videos. The shared labels may be assigned a ranking, and highest ranked labels may be displayed as video classifications, used for product placement advertisements and so forth. Various other ranking techniques of varying complexity are also contemplated and are considered to be within the scope of this disclosure.

In one example, the assignment and classification module 355 may cluster personalized and non-personalized video recommendations together for display on the client device 370a or 370b. For example, rather than displaying videos solely based on viewing history or preferences, or rather than displaying videos solely based on what is trending or popular among a collective group of viewers, videos may be clustered and displayed which include both trending and popular videos as well as recommended videos determined according to the user history and preferences. More specifically, the personalized and non-personalized videos may be clustered into a single classification and an ordering of the personalized and non-personalized videos relative to one another within the classification may be based on, for example, the popularity of non-personalized videos and the strength of a preference or the interest of the user as determined by viewing history.

In one example, the system may include a rating module 345. The rating module 345 may enable receipt of reviews of the videos or ratings of the assigned labels from the client device 370a or 370b. Thus, for example, if a video has been assigned a 'light-hearted' label, but a user does not agree that the video is 'light-hearted', the user may be enabled to rate the label, such as using a star rating system where five stars is 'accurate' or 'agree' and one star is 'inaccurate' or 'disagree'. Any other suitable rating system may also be employed as may be understood.

In one example, a cluster of videos or videos assigned to a classification may include a representative subset. The assignment and classification module 355 may provide listings of videos included in the cluster of videos that are different from the listings of the videos in the representative subset for display when the representative subset is selected. For example, when a user selects a category or classification (as in FIG. 1) which includes three videos as a representative subset, the videos in the classification or cluster shown (as in FIG. 2) may differ from those in the representative subset. For example, the videos from the representative subset may be relegated to a position off of the initial display, as is the case with videos 4, 8, 13, 1, 16 and 9 in FIG. 2. As another example, the representative subset may include the videos initially displayed in FIG. 2 and the remainder of the classification is available by selection of the subset (e.g., the arrow at the side of the subset) to scroll to view the additional videos. In other words, the videos displayed in the representative subset may not be repeated when the video classification is shown or vice versa.

The computing device(s) 310 may include a server. A data store may store media content and media related content for the server. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The media content stored by the media storage module may be video content, audio content, text content or another type of media content. Examples of media content may include full-length movies, video clips, video trailers, television programs, animated programs, audio books, pod casts, radio programs, books, magazines, articles, RSS (Really Simple Syndication) feeds, live video events, still image slide shows, and other types of media content that may be presented to a user.

Client devices 370a-370b may access data, content items and so forth at the computing device 310 over a network 365. Example client devices 370a-370b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 385 that may receive and present the media content.

Users may also be identified via various methods, such as a unique login and password, a unique authentication method, an Internet Protocol (IP) address of the user's computer, an HTTP (Hyper Text Transfer Protocol) cookie, a GPS (Global Positioning System) coordinate, or using similar identification methods. A user may have an account with the video server, service or provider, which may optionally track viewing history, store user preferences and profile information and so forth.

The system may enable intuitive and automated decisions for deciding which videos to display for different categories or classifications and in which order, as in FIGS. 1-2. The system may enable the mixing of personalized and non-personalized content. The system may provide category or classification rankings, which may be a mix of personal preference and sales or viewing popularity of videos. The system may provide video listing deduplication, where videos already shown on a previous page or in another list are pushed down from first page results or removed completely from a video list, so that a greater diversity of videos may be shown to a user earlier. Similarly, for rows of videos as in FIG. 2, rows that do not add much or any new content to the page may be removed from view. In one aspect, each of the representative subsets of videos (see 110-120) shown in FIG. 1 may be a preview of a larger set of videos to be shown, such as in FIG. 2 (see 214, 216, 218). In another example, the system may recommend television series season selection based on previously viewed episodes or seasons of the television series. Also, as will be described in additional detail later, the system may identify category affinities by calculating a highly representative category for a given video based on user behavior (such as watching or purchasing a video within a category affinity), and the affinities may be used in rendering the subsets and sets of videos shown in FIGS. 1-2.

Figure 4:
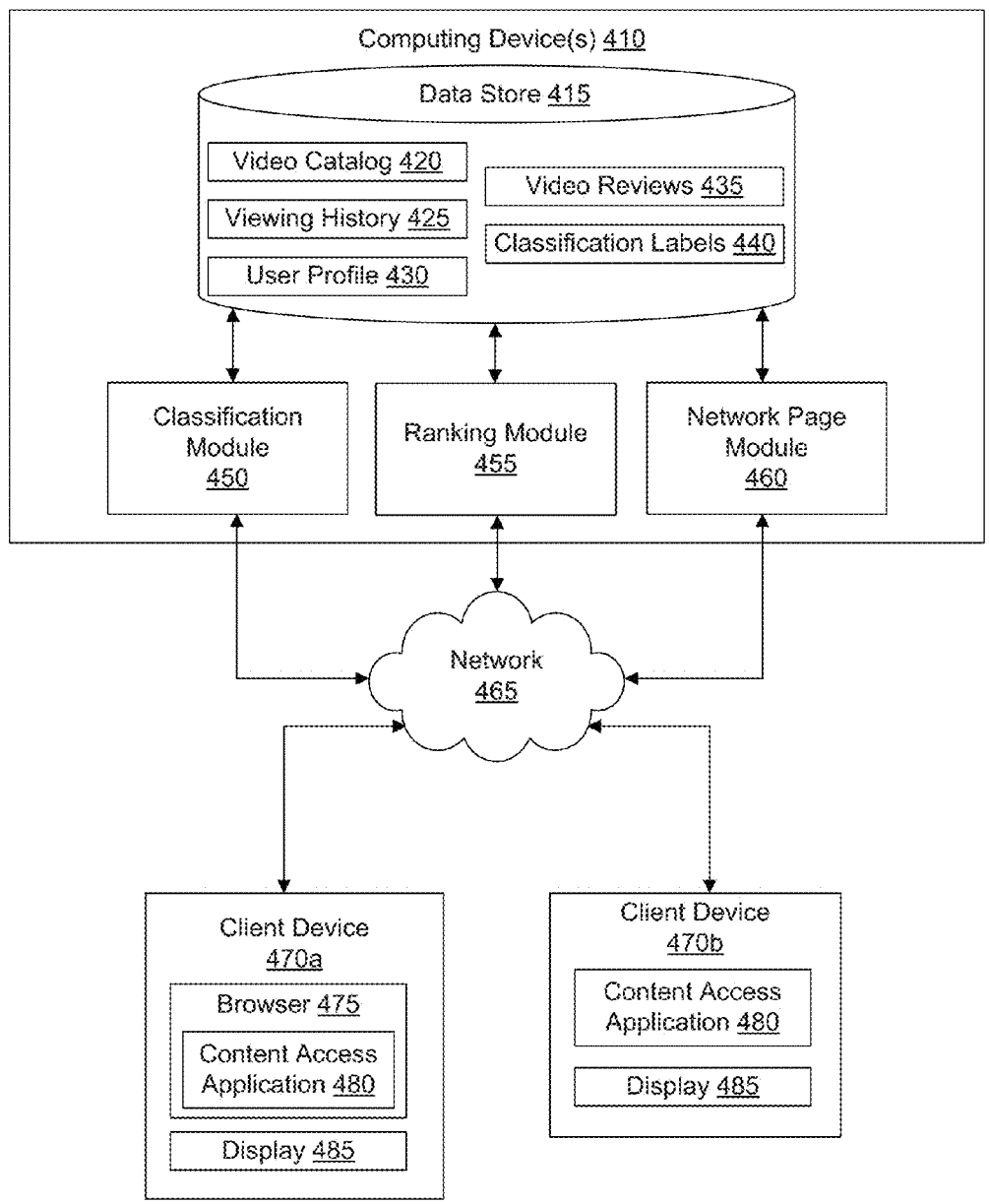
FIG. 4 is a block diagram of a system for managing content item category affinities in accordance with an example of the present technology.

Referring to FIG. 4, a block diagram of a system for managing content item category affinities is illustrated in accordance with an example of the present technology. The system is similar in some regards to the system of FIG. 3 and may identify or manage category affinities. Whereas the system of FIG. 3 may identify classifications or categories of videos, the system of FIG. 4 may manage category affinities that have been identified and assigned. The system may include a data store 415 including a variety of data stores similar to those previously described, including, but not limited to: a video catalog 420, a viewing history 425, a user profile 430, video reviews 435, classification labels 440 and so forth. The system may include a classification identification module or simply "classification module" 450, to identify a plurality of classifications for a content item, such as a digital video. A ranking module 455 may be used to identify a ranking of the plurality of classifications relative to one another for the content item.

A network page module 460 may be used to provide a user interface representation of the video (e.g. a video thumbnail or title) for display on a client device 470a-470b display 485 via a browser 475 or content access application 480 with user interface representations of other videos having a same classification when a request for one of the plurality of classifications is received from the client device 470a, 470b.

The system may optionally also include a text analysis module to analyze a review related to the video to identify an evaluation attribute from within the review. A label assignment module may be included to generate at least one label based on the evaluation attribute and to associate the label(s) with the videos, and the label may be a classification label. A search module may receive a search query from a user and generate search results in response to the search query. A clustering module may provide a cluster of videos having a label associated with the search results for display on a client device. In one aspect, the label assignment module and clustering module may be comprised by an assignment and classification module as described with respect to FIG. 3. In other words, the system of FIG. 4 may include some or all of the modules and functionality of the system of FIG. 3 and vice versa.

The system may be implemented across one or more computing device(s) 410, 470a, 470b connected via a network 465. For example, a computing device 410 may include a data store 415 and various engines and/or modules such as those described above and such modules may be executable by a processor of the computing device 410.

The modules that have been described may be stored on, accessed by, accessed through, or executed by a computing device 410. The computing device 410 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 410 is referred to herein in the singular form. Even though the computing device 410 is referred to in the singular form, however, it is understood that a plurality of computing devices may be employed in the various arrangements described above.

Various applications and/or other functionality may be executed in the computing device 410 according to various embodiments, which applications and/or functionality may be represented at least in part by the modules that have been described. Also, various data may be stored in a data store 415 that is accessible to the computing device 410. The data store 415 may be representative of a plurality of data stores as may be appreciated. The data stored in the data store 415, for example, may be associated with the operation of the various applications and/or functional entities described. The components executed on the computing device 410 may include the modules described, as well as various other applications, services, processes, systems, engines or functionality not discussed in detail herein.

The client devices 470a, 470b shown in FIG. 4 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 470a, 470b may include a respective display 485. The display 485 may comprise, for example, one or more devices such as cathode ray tubes (CRTs), liquid crystal display (LCD) screens, gas plasma based flat panel displays, LCD projectors, or other types of display devices, etc.

Each client device 470a, 470b may be configured to execute various applications such as a browser 475, a respective page or content access application 480 for an online retail store and/or other applications. The browser 475 may be executed in a client device 470a, 470b, for example, to access and render network pages, such as web pages or other network content served up by the computing device 410 and/or other servers. The content access application is executed to obtain and render for display content features from the server or computing device 410, or other services and/or local storage media.

In some embodiments, the content access application 480 may correspond to code that is executed in the browser 475 or plug-ins to the browser 475. In other embodiments, the content access application 480 may correspond to a standalone application, such as a mobile application. The client device 470a, 470b may be configured to execute applications beyond those mentioned above, such as, for example, mobile applications, email applications, instant message applications and/or other applications. Users at client devices 470a, 470b may access content features through content display devices or through content access applications 480 executed in the client devices 470a, 470b.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 5:
FIG. 5 is an illustration of a video search results page in accordance with an example of the present technology.

Referring to FIG. 5, a product search results page 505 is provided where a user has entered a search query in a search field 530 for "vintage humor". A user may optionally be presented with a list of alternate or suggested searches or search categories, such as in drop-down box 532. A number of search results 540 are returned. At the left side of the page is a list of departments 515, with a list of genres under the Movies & TV department. Whereas, the genres may include some conventional video classifications, "vintage humor" may not typically be included in such a list. However, by analyzing user reviews and labeling videos, search results 540 may be provided which are similar to what a user wishes to see. In other words, a search can be performed over the labels generated by analyzing the reviews for the content items. In this example, the top results included three different Charlie Chaplin videos, but actual results may be different or more varied.

FIG. 5 also includes a related searches section 520 which may suggest other labels for which the user may desire to search if the user's desired results are not found with the current search query. The other labels for related searches may also be based on reviews and user input. For example, conventional video classifications may include 'comedy' rather than 'humorous' or 'funny silent film', but based on an analysis of the reviews of videos, such labels may be assigned to videos and used to facilitate navigation and/or searching of videos. Related search suggestions may be based on a similarity of labels, based on a presence or association of the related labels with the videos returned in the search results at or above a predetermined threshold (e.g., 30% of the search results also included a common label which may be used as a 'related' label), or based on a viewing history of users with similar searches (e.g., users who searched this term watched videos with these labels).

In one example, search queries may form a basis of labels assigned to videos. For example, if users search for "Charlie Chaplin satire" and then select a Charlie Chaplin video which is unassociated with a 'satire' label or other 'satire' classification, then the 'satire' label or classification may be assigned to the selected video. To ensure that assignment of the label or classification is accurate, a system may wait until a search and selection has been made a minimum number of times before making the assignment or may determine whether the 'satire' designation is sufficiently similar to 'comedy' or other existing classifications for the video to add the 'satire' label even without reaching a predetermined minimum number of searches and selection with the 'satire' term.

FIG. 5 also illustrates that a user may be enabled to rate an assigned classification. For example, a star rating system 525 is used where a user can rate out of five stars how well the video fits the classification, as has been described previously. The classification rating may be on a search results page such as in FIG. 5 or as in FIG. 2.

Figure 6:
FIG. 6 is an illustration of a video detail page including reviews in accordance with an example of the present technology.

Referring to FIG. 6, an individual video page 605 is illustrated which may include a summary 610 of the plot of the video, a list of the cast 615, user review information 620 and any other desirable or suitable information. As has been described, the user reviews 620 may be used as a source for additional labeling of videos to facilitate navigation and searching. FIG. 6 can be considered in the context of FIG. 5, a user may have entered a search query for 'vintage humor'. Upon selection of one of the search results, a user may be taken to the individual video page 605 of FIG. 6, where product reviews 620 are available which may include the phrase 'vintage humor' from which the label originated. In addition, the classification rating option may be provided on an individual video page.

In some examples, a label applied to one video may be automatically applied to other videos if the system may reasonably determine that the other videos are sufficiently related. For example, if the entire collection Charlie Chaplin videos are humorous and relatively old, then the 'vintage humor' label applied to one Charlie Chaplin video, based on user reviews or search queries, may be extended to the other Charlie Chaplin videos. If some Charlie Chaplin videos are humorous and the videos (e.g., movies) are relatively old, then the 'vintage humor' label may be applied to those videos which are humorous. In some examples, such as with 'vintage humor', a label may be a composite of multiple descriptive labels, such as 'vintage' and 'humor'. When extending a label to other videos, or even when applying a label to an individual video, a composite label may be broken down to constituent parts that are still representative of the video and may be assigned as appropriate. Thus, for example, where 'vintage humor' is identified as a label for an individual video, the labels 'vintage' and 'humor' may also be applied to the individual video. Other videos determined to be sufficiently similar may have one or more of the 'vintage humor', 'vintage' and 'humor' labels applied as appropriate, based on user input, such as reviews, comments or the like, or based on sufficiently similar category affinities, or based on machine learning analysis of the videos.

Figure 7:
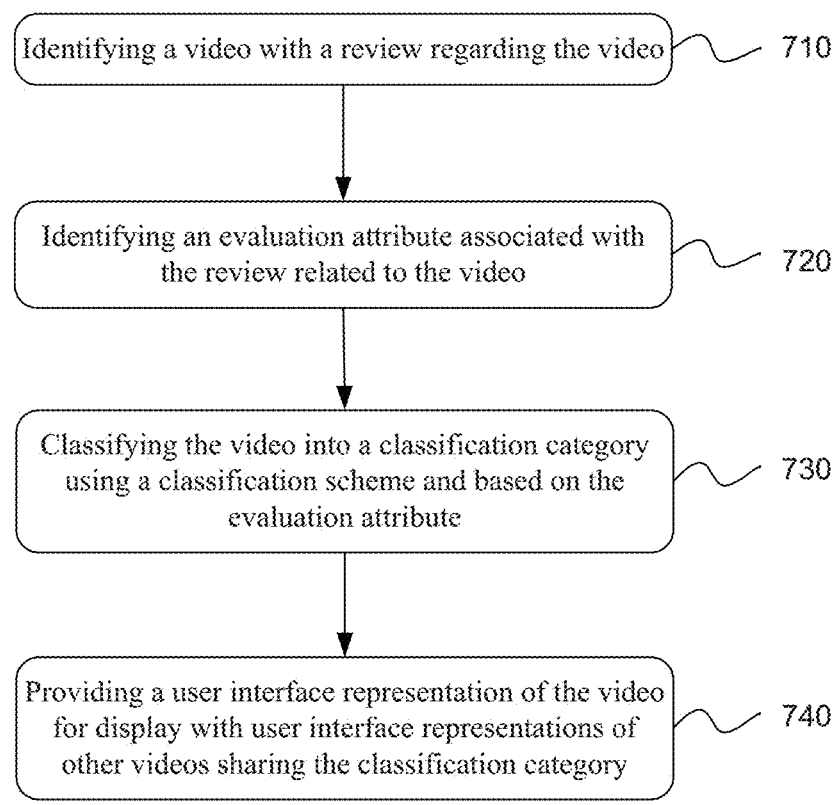
FIG. 7 is an example flowchart illustrating a method of classifying videos in accordance with an example of the present technology.

Referring now to FIG. 7, a flow diagram of a method for classifying videos is illustrated in accordance with an example of the present technology. The method may include identifying 710 a video with a review regarding the video. If a video has been recently added to a catalog and has not yet received reviews, the process may not be applied to the video until at least one review has been received. An evaluation attribute associated with the review and related to the video may be identified 720, such as by using a processor and analyzing the review. The video may be classified 730 into a classification category using a classification scheme based on the evaluation attribute. The classification category may be a label assigned based on evaluation attributes identified from the review. The method may also include labeling the video with the classification category. The classification scheme may include rules designating, for example, the creation of new labels for new classifications when an existing label is not found for a characterization of a video found in a review. The rules may also be used for clustering of sufficiently similar labels together. A user interface representation of the video may be provided 740 for display with user interface representations of other videos sharing the classification category. The user interface representations may include, for example, at least one of an image, text, hyperlink, video clip, audio clip and so forth.

The classification categories implemented in the method may be selected from the group consisting of: theme, mood, genre, type and setting. A classification category may include a plurality of classifications. For example, classifications for a video type may include the classifications of romance, horror, sci-fi, adventure, etc. The method may also include providing the classification category for display as an interface object to enable narrowing video search results. For example, FIG. 5 illustrated related searches, as hyperlinks or user interface objects, which may narrow or alter the search query or search results. These related searches may represent classification categories that are presented to assist the user in narrowing or modifying the search.

In one example, the classification category may be a mood. The classification category may be identified based on a statistical distribution or histogram plot of keyword tags for a video. The plotted keyword tags may be based on user generated content. The classification of the video may be identified by plotting mood-related tags in a probability distribution and identifying tags with a high representation in the probability distribution as being indicative of the mood. Tags or other user generated content may be identified as mood-related by comparing the tags to a standard set of words associated with particular moods.

Figure 8:
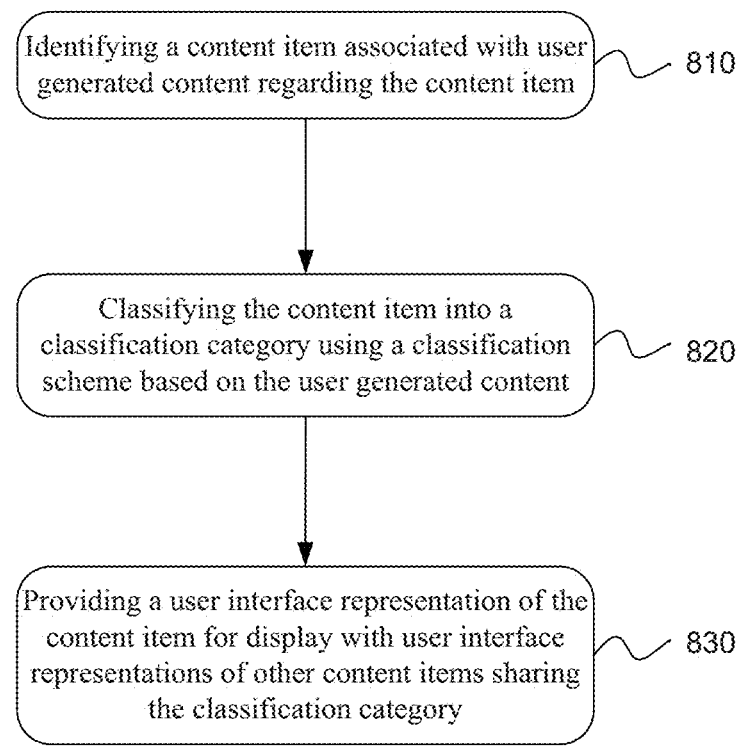
FIG. 8 is a flowchart illustrating an example of a method for classifying content items in accordance with an example of the present technology.

Referring now to FIG. 8, a flow diagram of a method for classifying content items, such as books, videos, songs, albums, etc. is illustrated in accordance with an example of the present technology. The method may be similar in some ways to that described regarding FIG. 7 and may include identifying 810 a content item associated with user generated content, such as a review or comment, regarding the content item and classifying 820 the content item into a classification category using a classification scheme based on the comment. The classification scheme may include classification rules to classify evaluation attributes into classification categories, as has been described. The classification rules may include machine-learned rules, which may be machine-learned based on trusted classification categories for a set of content items. For example, a set of attributes for content items may be hand-curated and classified as a trusted base from which machine learning may learn and apply classification rules.

The comment may include subjective data regarding the content item, or rather the portion of the comment used as a basis for classifying the content item may be subjective. For example, in a comment stating "this is the best Charlie Chaplin vintage humor film you will find", Charlie Chaplin's presence in a Charlie Chaplin film is objective rather than subjective and may be excluded as a basis for a label while "vintage humor" is subjective and may provide a basis for a label. In alternate configurations, labels may comprise either objective or subjective data or a combination of objective and subjective data. A user interface representation of the content item may be provided 830 for display with user interface representations of other content items sharing the classification category.

In one example of the method, the user interface representation of the content item may be provided for display with the user interface representations of the other content items sharing the classification category as a combination of personalized and non-personalized content item selections.

The method may also include identifying a plurality of classification categories for the content item and identifying a ranking of the plurality of classification categories relative to one another based on user input using the processor. The method may also include providing the user interface representation of the content item for display with the user interface representations of the other content items having the same classification category when a request for one of the plurality of classification categories is received from the client device. For example, a category affinity may be identified and the videos may be ranked accordingly. In one aspect, ranking of videos or labels may be based on an evaluation of reviews of the content item to determine an occurrence rate of the plurality of classification categories within the reviews. A higher rate of occurrence may result in a higher ranking of one label relative to another label. For example, if a 'vintage' label is based on the presence of 'vintage' in user reviews a total of 20 times and 'humor' is present 100 times in the reviews, then 'humor' may more accurately represent how users feel about a video than 'vintage'.

In one example, the method may include predicting a theme of the content item based on the classification category or the evaluation attribute. For example, a suspense film may be identified as having a theme of revenge when terms such as 'revenge', 'retaliation', 'retribution', 'payback' or the like are identified as the classification or evaluation attribute.

In some instances, users may create lists of videos, and the lists may be used for classification purposes. In other words, a user may create a list of "My Favorite Revenge Movies". Such list may include any number of videos the user feels represent the 'revenge' category. The system may analyze this list to determine whether 'revenge' is associated with the videos listed which are in the system catalog and associate the 'revenge' label with the videos when not already associated. As has been described previously, classification of videos may be broadly based on user feedback or input generally and may not be limited to reviews of a video. Lists may be an example of a user comment or user feedback from which classification information may be sourced. The lists or items in the lists may not necessarily be linked or programmatically associated specifically with any of the videos in the list and may be independent of other reviews, video information and so forth. For example, the list may be in the form of a network page, blog post, forum thread, poll or any other suitable listing option.

The method may include classifying the content item into a plurality of classification categories. Users may be enabled to indicate a usefulness of at least one of the plurality of classification categories, and the plurality of classification categories may be prioritized according to the indication of helpfulness. In other words, a user may rank the classification and indicate whether the classification is accurate or representative of the content item. Less accurate or less representative classifications may be subjugated below more accurate or representative classifications for a content item.

In some examples, this or other methods described herein may be implemented as computer readable program code executed by a processor and the computer readable code may be embodied on a non-transitory computer usable medium.

Figure 9:
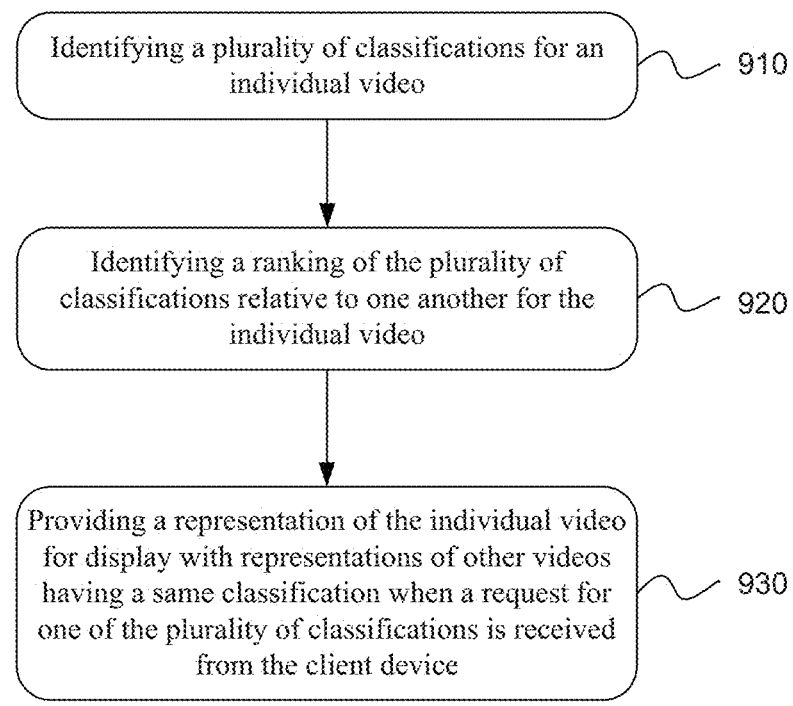
FIG. 9 is an example flowchart illustrating a method of identifying category affinities for videos in accordance with an example of the present technology.

Referring now to FIG. 9, a flow diagram of a method of identifying category affinities for videos is illustrated in accordance with an example of the present technology. The method may include identifying 910 a plurality of classifications for an individual video. In other words, rather than simply categorizing the video in a singular classification as comedy, drama or the like, the video may be more granular and include multiple classifications for any number of genres, themes, moods, etc. The method may include identifying 920 a ranking of the plurality of classifications relative to one another for the individual video. A user interface representation of the individual video may be provided 930 for display on a client device along with user interface representations of other videos having a same classification when a request for one of the plurality of classifications is received from the client device. The arrangement of the videos may be based on the ranking of the classifications relative to one another. For example, if one video is classified as 60% comedy and another video is classified as 40% comedy, then the 60% comedy video may be displayed earlier or more prominently than the 40% comedy video when a user is searching for comedy videos.

Identifying the ranking of videos may include evaluating reviews, comments or other user input associated with or related to the individual video to determine an occurrence rate of the plurality of classifications (i.e., labels) within the reviews. In this example, the occurrence rate of the classifications within the reviews may be directly correlated with the classification rankings. More specifically, if reviews of a video primarily designate the video as belonging to 'comedy' and 'drama' classifications, but 'comedy' is indicated 60% of the time while 'drama' is indicated 40% of the time, then the video may be classified as 60% comedy and the percentage may then be compared to a comedy affinity value of other videos for ranking.

In one example, ranking of a classification relative to other classifications or of a video relative to other videos may be improved based on user intent inferred from browsing/viewing activity of the user. In this example, identifying the ranking may include identifying a classification common to the video and a second video requested by a client device, and improving the ranking of the classification common to the video and a second video. For example, if a user is browsing or searching for a video and views additional details about a subset of the browsed videos or actually watches the subset of the browsed videos, an assumption may be made that the user is looking for videos of a particular genre, mood or the like. Accordingly, the method may involve comparing video details or classification details to determine what among the subset of the videos is the same. When a classification common to the videos in the subset is identified, then a ranking for that classification may be increased or improved for the videos in the subset relative to other videos, even if by a small degree. The more the user or other users performs similar browsing or viewing activity, the more that classification may be more highly ranked for a particular video in the subset relative to other videos.

In another example, identification of the ranking may include identifying a request frequency of the one of the plurality of classifications relative to the other videos having the same classification. Thus, rather than looking at user reviews or other factors to determine a percentage or other representation of a video belonging to one classification or another, a frequency with which videos are selected for viewing or purchase when assigned to one classification or another may be used as a basis for ranking. If a video is classified as a comedy but very few users searching for comedies actually watch the video, then the video may be ranked lower as a comedy than other videos that are more frequently requested. If this same video is classified as a drama and is frequently requested as a drama, then a ranking of the video as being a drama may be increased.

The method may include determining whether the individual video is an accurate representation of the one of the plurality of classifications. For example, users may be enabled to rate the classifications as discussed with regards to FIG. 5. As another example, an accuracy of a video classification may be determined by analyzing the request frequency as described above, where more frequent requests within a classification may indicate greater accuracy of the classification while less frequent requests within the classification may indicate poorer accuracy of the classification. When an individual video is determined to be a poor representation of the one of the plurality of classifications to which the video is assigned, the method may include dissociating the one of the plurality of classifications from the individual video. In a further configuration, a video may be simply ranked lower and lower among the videos in the classification. If the video does not fit another classification well, the video may remain in the classification as a low-ranked video. However, if the video does not fit the immediate classification well but does fit another classification well, then the poor classification may be removed from the video, leaving or substituting the good classification for the poor classification.

Figure 10:
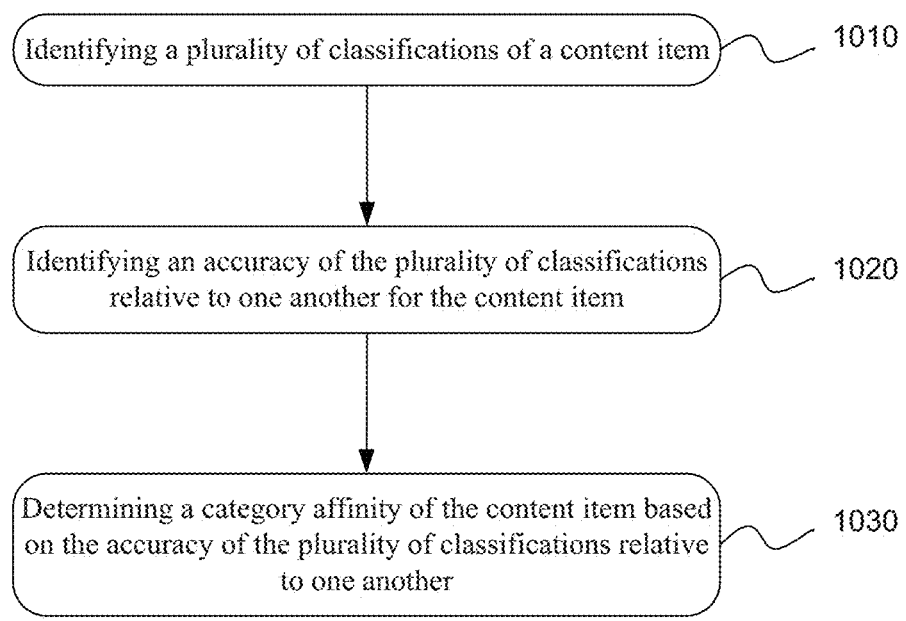
FIG. 10 is a flowchart illustrating an example of a method for identifying content item category affinities in accordance with an example of the present technology.

Referring now to FIG. 10, a flow diagram for identifying content item category affinities is illustrated in accordance with an example of the present technology. The method may include identifying 1010 a plurality of classifications of a content item and identifying 1020 an accuracy of the plurality of classifications relative to one another for the content item. A category affinity of the content item may then be determined 1030 based on the accuracy of the plurality of classifications relative to one another. As an example, the accuracy of the plurality of classifications may be represented as an estimated percentage indicating a percentage for the content item fitting each of the plurality of classifications, as has been previously described in the examples of FIG. 9. The content item may be evaluated relative to other content items to assign the plurality of classifications and to identify the accuracy of the plurality of classifications, such as by using machine learning as described previously.

In one example, the percentage fit of a classification to the content item may be combined with the percentage fit of other classifications to the content item such that when summed total 100% or more. For example, an assignment percentage may be configured such that a total assignment will equal 100%, with each of the classifications receiving a portion of the total percentage. In this manner, the content item may be identified as, for example 50% comedy and another 50% of one or more other classifications. While this implementation may be useful for some instances, some degree of inaccuracy may also result. For example, a video may be a romantic comedy that includes romance and comedy throughout an entirety of the video. Classification of the video as 50% comedy and 50% romance may be inaccurate since the comedy and romance continue throughout. By enabling the percentage assignment for each classification to go up to 100% with a total percentage of all of the classifications higher than 100% may facilitate accurate classifications for some instances. For example, the video may actually be approximately 80% comedy, 80% romance, 10% drama and 2% suspense. In this example, a total is greater than 100% and a more accurate breakdown of the classifications is obtained. However, for practical purposes, the video may have a low enough representation of drama and suspense that the video is low ranked among drama and suspense videos, if even ranked or displayed. In one example, rather than use percentages, a raw numerical scale may be used to represent category affinities, such as a scale of 0 or 1 to 100 or 1,000 or any other suitable scale. In one example using percentages, a total percentage of the classifications may be less than 100%, such as when a remainder of the percentage is unknown, when one or more classification percentages are not significant (e.g., less than a predetermined threshold percentage), when a number of total classifications is limited to less than an actual number of classifications, and so forth.

In one example, the content item may be ranked among search results based on account type and request velocity of the content item from other client devices. For example, many other users viewing or purchasing the content item may result in the content item receiving a higher ranking In some applications, users may have different account privileges, such as viewing certain videos at no charge or at a reduced charge, such as if the user subscribes to a membership program. In these examples, an assumption may be made that a subscribing user intends to view content items available at no additional charge before content items available with a fee. Thus, content items may be ranked based on the account type, such that 'free' videos are displayed first, with request velocity, personal preferences, search input, and any other factors considered to rank the 'free' videos. The request velocity rank weighting may be based on a request velocity for the 'free' videos by other subscribing users. For non-subscribing users searching or viewing premium content, the rankings may be different and may be based on request velocity, preferences and so forth as applied to premium content and based on other non-subscribing user purchases.

In one aspect, a ranking of the content item among search results may be altered based on a context in which a client device requests the search results. For example if a user spends time searching and navigating among content items, seemingly unable to find a desired content item, the system may evaluate the context of the current browsing session in an attempt to identify what the user is really searching for, and the search results may be modified accordingly, while still fitting within the parameters of current search instructions from the user. In the absence of a current session history, the search results may be unaltered and may be returned normally. A user's viewing history, account type, personal preferences and other factors may also be part of the context which may affect search results.

The method may include tracking user interaction with the content item when a request is received for one of the plurality of classifications and the accuracy of the classifications may be modified based on the user interaction. In other words, when a content item is classified with multiple classifications and one classification is more frequently selected than another, then the less frequently selected classification may be modified to indicate a lesser accuracy while the more frequently selected classification may be modified to indicate a greater accuracy.

In one example, the present technology may enable users to describe characteristics of the kind of movie or TV show the users feel like watching by answering a few simple questions. While users may often discover content items through best-seller lists, by searching for an actor or director, looking at similar content items purchased or viewed by other users or by looking through personalized movie recommendations, users may sometimes desire to find a movie or TV show to watch immediately. The user may have a certain interest or mood in mind, but not a specific title, and may also be looking to break out of previous watching patterns or simply explore new kinds of movies or TV shows. Users may be directed toward content items through the questions. Some examples of questions include "Are you looking for a movie that's set in the future?"; "Do you want a dark and gritty drama or a lighthearted comedy?"; and so forth. In other embodiments, rather than asking questions, content item classifications may simply be presented to a user, such as "futuristic", "gritty drama", "light-hearted comedy" and so forth. The classifications may be based, at least in part, on user input or comments. Tailored movie or TV show suggestions may be provided to the user. Over time, questions or classifications presented to the user may be optimized individually for the user based on past viewing preferences.

Figure 11:
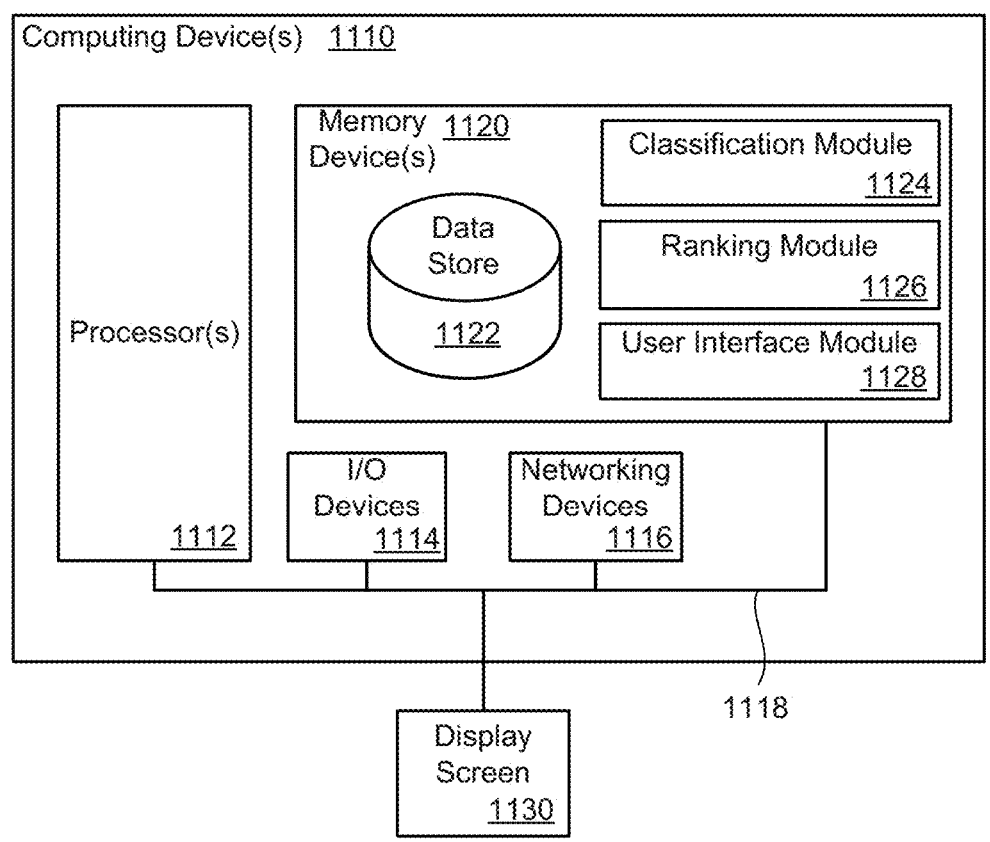
FIG. 11 is block diagram illustrating an example of a computing device for video classification in accordance with an example of the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules that are executable by the processor(s) and data for the modules. Located in the memory device 1120 are modules executable by the processor. For example, a classification module 1124, a ranking module 1126, and a user interface module 1128, as well as other modules, may be located in the memory device 1120. A data store 1122 may also be located in the memory device 1120 for storing data related to the modules and other applications along with an operating system that is executable by the processor(s) 1112.

The computing system 1110 of FIG. 11 may be utilized for computing processes, or in a more specific example, for correlating proper nouns across languages and facilitating searches for the proper nouns across languages. For example, the classification module 1124 may be used to analyze videos and/or user comments to classify the videos. The ranking module 1126 may rank the videos, based on classification, relative to one another. The user interface module 1128 may enable users to browse the videos based on rankings and according to assigned classifications, as well as rate classifications.

The computing device 1110 may further include or be in communication with a client device 1130, which may include a display device. The client device 1130 may be available for an administrator to use in interfacing with the computing device 1110, such as to review operation of the system, modify rewards, make improvements to the system and so forth.

Various applications may be stored in the memory device 1120 and may be executable by the processor(s) 1112. Components or modules discussed in this description that may be implemented in the form of software using high programming level languages that are compiled, interpreted or executed using a hybrid of the methods.

The computing device 1110 may also have access to I/O (input/output) devices 1114 that are usable by the computing devices. An example of an I/O device 1114 is a display screen that is available to display output from the computing devices. Other known I/O device may be used with the computing device as desired. Networking devices 1116 and similar communication devices may be included in the computing device 1110. The networking devices 1116 may be wired or wireless networking devices 1116 that connect to the internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor 1112. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

The system may be used for any of a variety of languages written in any of a variety of different writing systems. The system may be applicable to any of a variety of types of queries, such as author names, actor names, brands, and so forth. Longer fields, such as titles of books, articles, movies and the like may be more challenging but may also work with the present technology.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A method for a network page that represents category affinities for videos, comprising:
generating, using at least one processor, the network page associated with an electronic retailer containing a representation of a video having a classification, and representations of other videos having a same classification;
wherein generating the network page includes:
identifying a plurality of classifications for the video;
determining a ranking of the plurality of classifications relative to one another for the video based on evaluating reviews of the video to identify an occurrence rate of the plurality of classifications within the reviews;
identifying a video browsing activity that includes a search for the video that returns the video and related videos having a classification in common with the video;
increasing the ranking of a classification within the plurality of classifications as a result of identifying a subset of videos having a classification in common with the video that have been selected for viewing or viewing video details as part of the video browsing activity;
wherein, the classification is dissociated from the video when an affinity of the video with the classification is below a predetermined threshold; and
providing the network page to a client device that requested the network page.

2. The method of claim 1, wherein identifying the ranking comprises identifying a classification common to the video and a second video requested by a client device, and increasing the ranking of the classification common to the video and a second video.

3. The method of claim 1, further comprising determining whether the video is an accurate representation of the selected classification.

4. The method of claim 3, wherein determining whether the video is an accurate representation comprises at least one of: receiving ratings of the selected classification or tracking user interaction with respect to the video in the one of the plurality of classifications.

5. A method for generating a network page that represents item category affinities for an item, comprising:
generating by at least one processor the network page, wherein generating the network page includes:
identifying a plurality of classifications of the item;
identifying an accuracy of the plurality of classifications relative to one another for the item;
increasing the accuracy of a classification within the plurality of classifications as a result of identifying a subset of items having a classification in common with the item, the subset of items being included with the item as part of an item browsing activity that includes a search for the item that returns the item and related items having a classification in common with the item and the subset of items selected as part of the item browsing activity;
determining a category affinity of the item based on the accuracy of the plurality of classifications relative to one another, wherein classification is dissociated from the item when an affinity of the item with the classification is below a predetermined threshold; and
providing the network page containing a representation of the item having the category affinity and representations of other items having the category affinity.

6. The method of claim 5, wherein the accuracy of the plurality of classifications comprises a plurality of estimated percentages indicating a percentage of the item fitting each of the plurality of classifications.

7. The method of claim 6, wherein a sum of the estimated percentages totals 100%.

8. The method of claim 6, wherein a sum of the estimated percentages is greater than 100%.

9. The method of claim 6, wherein a sum of the estimated percentages is less than 100%.

10. The method of claim 5, further comprising providing a user interface representation of the item for display with representations of other items having a same classification when a request for one of the plurality of classifications is received from a client device.

11. The method of claim 5, further comprising ranking the item among search results based on account type and request velocity of the item from client devices.

12. The method of claim 5, further comprising altering a ranking of the item among other items based on a context in which a client device requests the items.

13. The method of claim 5, further comprising tracking user interaction with the item when a request is received for one of the plurality of classifications, and modifying the accuracy of the one of the plurality of classifications for the item based on the user interaction.

14. The method of claim 5, further comprising ordering the representation of the video relative to the representations of other videos using an accuracy based on a ranking.

15. The method of claim 5, wherein the method is implemented as computer readable program code executed by the processor, the computer readable code being embodied on a non-transitory computer usable medium.

16. A system for managing content item category affinities, comprising:
  a processor;
  a memory device including instructions that, when executed by the processor, cause the system to:
  identify a plurality of classifications of a content item;
  identify a ranking of the plurality of classifications relative to one another;
  identify a content item browsing activity that includes a search for the content item that returns the content item and related content items having a classification in common with the content item;
  increase the ranking of a classification within the plurality of classifications as a result of identifying a subset of content items having a classification in common with the content item that have been selected as part of the content item browsing activity; and
  dissociate a classification from the content item when an affinity of the content item with the classification is below a predetermined threshold;
  generate a network page for an electronic retailer containing a representation of the content item for display on a client device with representations of other content items having a same classification and according to the ranking in response to a request from the client device for the network page containing one of the plurality of classifications.

17. The system of claim 16, wherein the memory device includes instructions that, when executed by the processor, causes the system to:
  analyze a review related to the content item to identify an evaluation attribute from within the review; and
  generate a label based on the evaluation attribute and to associate the label with the content item, the label being a classification label.

18. The system of claim 17, wherein the memory device includes instructions that, when executed by the processor, causes the system to receive a search query from a user and generate search results in response to the search query and based on the label.

19. The system of claim 18, wherein the memory device includes instructions that, when executed by the processor, causes the system to provide a cluster of content items having the label associated as the search results for display on a client device.

20. The system of claim 17, wherein the memory device includes instructions that, when executed by the processor, causes the system to cluster personalized and non-personalized content items together for display on the client device, the personalized content items being based on a history or preference stored with an account associated with the client device.

21. The system of claim 16, wherein the classifications are divisible into classification categories including: theme, mood, genre, type and setting.

* * * * *